United States Patent [19]

Benson

[11] 4,267,043
[45] May 12, 1981

[54] IMMISCIBLE LIQUID SEPARATING

[75] Inventor: Robert A. Benson, Cohasset, Mass.

[73] Assignee: Seapower, Inc., Cohasset, Mass.

[21] Appl. No.: 139,839

[22] Filed: Apr. 14, 1980

[51] Int. Cl.³ .................... B01D 15/00; B01D 33/14
[52] U.S. Cl. .............................. 210/241; 210/DIG. 5
[58] Field of Search .................... 210/40, 730 W, 167, 210/77, 241, 242 R, 242 S, 242 AS, 350, 502, DIG. 5, DIG. 26, 398, 400

[56] References Cited

U.S. PATENT DOCUMENTS

| | | | |
|---|---|---|---|
| 3,221,884 | 12/1965 | Muller | 210/DIG. 5 |
| 3,546,112 | 12/1970 | Will | 210/730 W |
| 3,608,727 | 9/1971 | Grutsch | 210/350 |
| 3,986,959 | 10/1976 | Bagot | 210/242 AS |
| 4,123,354 | 10/1978 | Williams | 210/242 AS |
| 4,197,204 | 4/1980 | Mathes | 210/DIG. 5 |

FOREIGN PATENT DOCUMENTS 2454159  5/1975  Fed. Rep. of Germany .... 210/DIG. 5

*Primary Examiner*—Ernest G. Therkorn

[57] ABSTRACT

Apparatus for separating immiscible liquid mixtures, such as oil-water mixtures, includes a closed loop tubular enclosure having a liquid mixture inlet and independent liquid outlets spaced from each other and from the inlet. The inner cross section area of the enclosure has a first reduced portion adjacent the first outlet and a second further reduced portion adjacent the second outlet. Selectively absorbent elements are driven around within the enclosure, preferably by the pressurized liquid mixture, for selectively absorbing the liquid mixture and selectively discharging one of the liquids through the first outlet upon mild compression by the first reduced portion and the other of the liquids through the second outlet upon higher compression by the second further reduced portion. A third outlet with a still further reduced portion may be provided for discharging the remaining portion of the other liquid. The final reduced portion also provides a differential piston hydraulic driving force for the selectively absorbent elements and also prevents backflow from the inlet directly to the last outlet.

11 Claims, 4 Drawing Figures

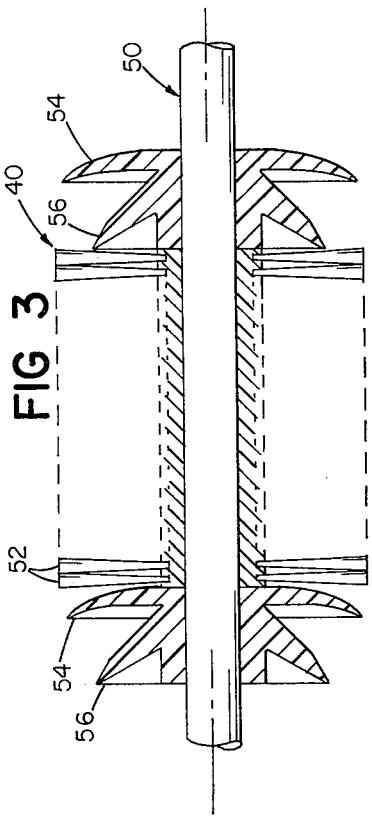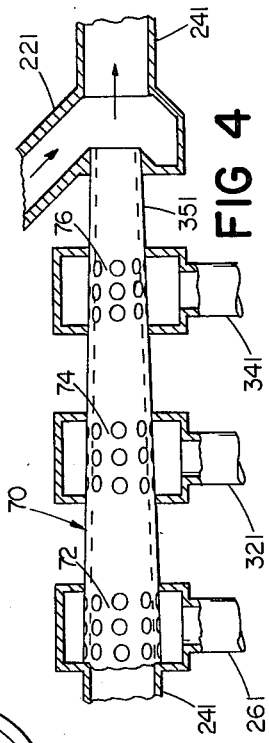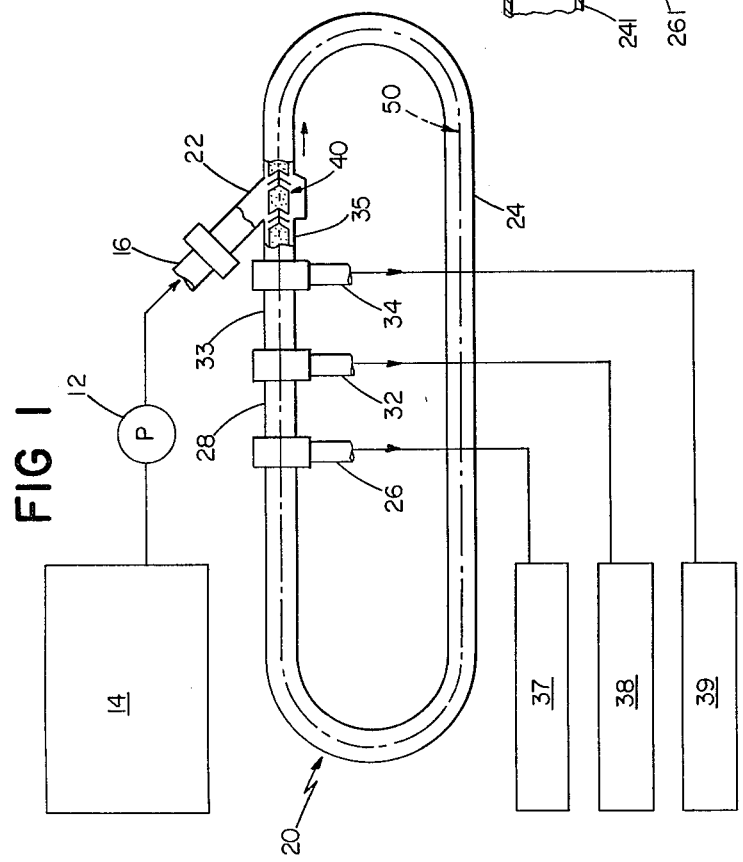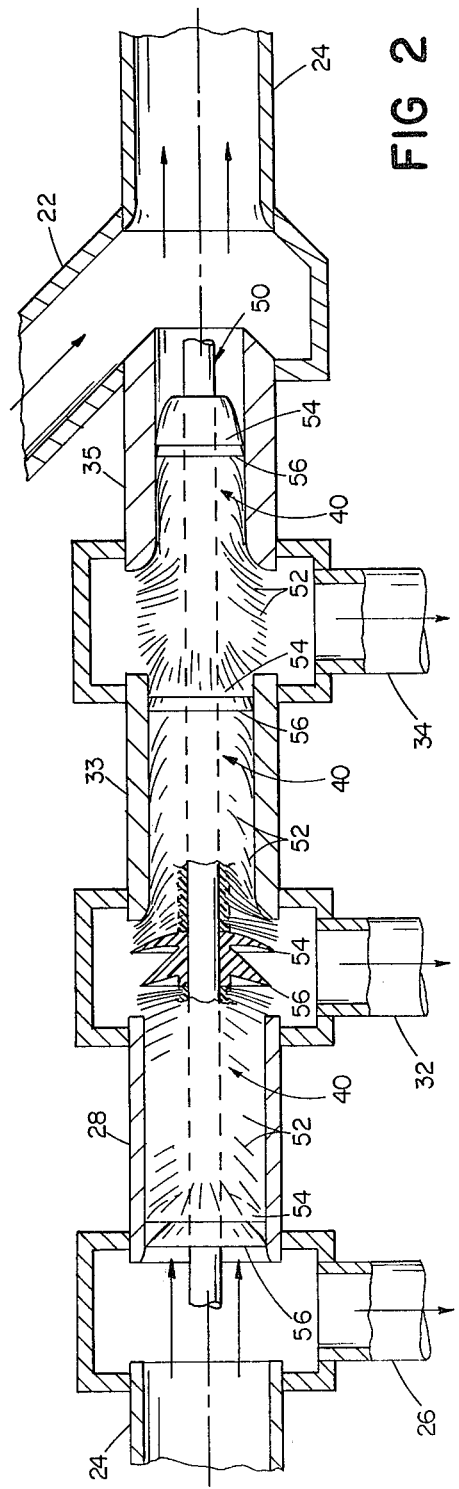

IMMISCIBLE LIQUID SEPARATING

This invention relates to apparatus for separating immiscible liquid mixtures, such as oil-water mixtures.

Many liquid separating devices have heretofore been used, for example, centrifuges, filters and gravity settling systems. However, these have all been deficient in a number of respects and have failed to provide suitable apparatus capable of continuous operation at high flow rates for the separation of mixtures of immiscible liquids, such as oil-water mixtures.

Another example of the various liquid separating devices in the prior art are skimming devices, such as are shown and described in Will et al., U.S. Pat. No. 3,546,112, and Grutsch et al., U.S. Pat. No. 3,608,727. These devices, however, are limited to the separation of liquids floating on the surface of other liquids, particularly oil floating on water.

Accordingly, it is a major object of the present invention to provide novel apparatus capable of continuous operation at high rates of flow for separating immiscible liquid mixtures.

It is another object of the present invention to provide novel apparatus capable of recovering reusable oil from oil-water mixtures.

It is a further object of the present invention to provide novel apparatus capable of recovering clean water from oil-water mixtures.

It is a still further object of the present invention to provide apparatus which may readily be moved to remote sites and installed on ships and at oil terminals and refineries.

In order to accomplish these objectives, the present invention provides novel apparatus for separating immiscible liquid mixtures, including emulsions, such as oil-water mixtures and emulsions. The apparatus includes a closed loop tubular enclosure having an immiscible liquid mixture inlet and independent first and second outlets spaced from each other and from the inlet. The inner cross section area of the enclosure has a first reduced portion adjacent the first outlet and a second further reduced portion adjacent the second outlet.

Selectively absorbent compressible means are provided within the enclosure and are mounted for movement therearound. The absorbent means absorbs at least a portion of the immiscible liquid mixture adjacent the inlet and selectively discharges a major portion of one liquid through the first outlet upon mild compression thereof by the first reduced portion and a major portion of the other liquid through the second outlet upon high compression thereof by the second further reduced portion.

In preferred embodiments, the apparatus of the present invention may further include a propelling and absorbing portion of the enclosure, located between the inlet and the first outlet and having a generally constant inner cross section area, in which the absorbent means is both driven around the enclosure by the pressurized immiscible liquid mixture and selectively absorbs and separates the mixture into its component liquids for separate discharge.

A third outlet, of still further reduced cross section area, may be located between the second outlet and the inlet to discharge further liquid.

The final reduced portion also provides a differential piston hydraulic driving force for the selectively absorbent means and prevents backflow directly from the inlet to the last outlet.

The selectively absorbent compressible element preferably has its support means in the form of a closed loop with a plurality of selectively absorbent fibers mounted on the support means and extending radially outward from its axis and may be provided with driving disks spaced therealong.

For the purpose of fully disclosing preferred embodiments of the invention, reference is now made to the following detailed description thereof, together with the accompanying drawings, wherein:

FIG. 1 is a diagrammatic side view of the apparatus of the invention;

FIG. 2 is a side sectional view of a portion of the apparatus of FIG. 1;

FIG. 3 is an enlarged side view of a portion of the selectively absorbent compressible element of the apparatus of FIG. 1; and FIG. 4 is a side sectional view of a modification of a portion of the apparatus of FIG. 1.

The apparatus of the present invention is useful for the separation of mixtures, including emulsions, of various immiscible liquid mixtures. Although the following description of the apparatus of the invention and its operation refers to the separation of oil-water mixtures, it is understood that the use of the apparatus of the invention is not limited to the separation of oil-water mixtures, but may be used to separate other mixtures as well.

Referring to the drawings and particularly to FIG. 1 thereof, the novel apparatus of the present invention, in general, includes a closed loop tubular enclosure, generally designated 20, having an oil-water mixture inlet 22, a water outlet 26 spaced from inlet 22 by an extended driving and absorbing portion 24 of enclosure 20, an oil outlet 32 and an oil outlet 34 located between water outlet 26 and inlet 22. Pump 12 is provided for feeding an oil-water mixture to be separated from reservoir 14 into inlet pipe 16 connected to inlet 22. The separated water is discharged through water outlet 26 into reservoir 37 and the separated oil is discharged through oil outlet 32 into reservoir 38. The remaining portion of the oil is discharged through oil outlet 34 into reservoir 39.

The inner walls of enclosure 20 are preferably cylindrical of predetermined cross section areas, as hereinafter more fully explained, with the inner cross section area of the working section of enclosure 20 being generally constant throughout its driving and absorbing portion 24.

More specifically, as best shown in FIG. 2, the cross section of the remainder of the working section of enclosure 20 is stepped to progressively decrease its cross section area by providing it with a first reduced cross section portion 28 between water outlet 26 and oil outlet 32, a second further reduced cross section portion 33 between oil outlet 32 and oil outlet 34, and a third still further reduced cross section portion 35 between oil outlet 34 and inlet 22.

Alternatively, as shown in FIG. 4, the progressively decreasing cross section may be provided by utilizing a frusto-conical section 70 with its largest end connected to the downstream end of driving and absorbing section 241. Frusto-conical section 70 has a first section of perforations 72 communicating with water outlet 261, a second section of perforations 74 communicating with oil outlet 321 and a third section of perforations 76 communicating with third outlet 341, with the smallest diameter portion 351 of frusto-conical section 70 being located between third outlet 341 and inlet 221.

It is also contemplated that more than a single working section, consisting of an inlet followed by cooperating outlets may be arranged within a single closed toop tubular enclosure.

As shown in FIGS. 2 and 3, a selectively absorbent compressible assembly, generally designated 40, of generally cylindrical configuration, is movably mounted within enclosure 20 with its periphery in contact with the inner wall of enclosure 20. It extends continuously around enclosure 20 for continuous movement therein, driven by the hydraulic force of the oil-water mixture through the working section of the apparatus from inlet 22 or 221, in a downstream direction from inlet 22 or 221, first to water outlet 26 or 261, next to oil outlet 32 or 321 and last to oil outlet 34 or 341.

Absorbent assembly 40 operates by selectively absorbing the oil-water mixture to separate it into its component liquids while it flows through driving and absorbing portion 24 or 241 and selectively discharging it upon progressive compression of assembly 40.

Such selective absorption, separation and discharge may involve various well known physical or chemical effects other than true absorption, including selective attraction of one of the liquids of the mixture to the elements of assembly 40, selective capillary attraction, differential surface tension effects and similar physical or chemical effects. Accordingly, as used herein, the words "absorb," "absorbing" and "absorption" are intended to include such other physical or chemical effects.

After absorbent assembly 40 selectively absorbs the oil water mixture, it selectively discharges first a major portion of the water of the mixture through water outlet 26 upon mild compression by the first reduced portion 28 or frusto-conical section 70, next a major portion of the oil of the mixture through oil outlet 32 or 321 upon high compression by the second further reduced portion 33 or frusto-conical section 70, and finally the remaining portion of the oil through oil outlet 34 or 341 upon still higher compression by the third reduced portion 35 or portion 351 of frusto-conical section 70. Final reduced portion 35 or 351 provides a differential piston hydraulic driving force for driving selectively absorbent assembly 40 and also prevents backflow directly between oil outlet 34 or 341 and inlet 22 or 221.

More specifically, as shown in FIG. 3, the selectively absorbent compressible assembly 40, in general, includes a central axial support 50, in the form of a closed and continuous loop extending around enclosure 20 therewithin supporting a plurality of radially outwardly extending selectively absorbent fibers 52 and a series of axially spaced driving and sealing disks 54, 56, as hereinafter more fully explained.

Referring first to the selectively absorbent materials, although other types of selectively absorbent materials such as open cell foam materials might be used, it is preferred to utilize a plurality of selectively absorbent plastic fibers mounted on support 50, extending radially outwardly therefrom, preferably sloping rearwardly with respect to their direction of movement, toward and into contact with the inner wall of enclosure 20. Fibers 52 may be of polypropylene or similar material, and may have a diameter of about 0.002 to 0.010 inches for use within an enclosure 20 that has an inside diameter in its driving portion 24 slightly less than that of the outside diameter of selectively absorbent assembly 40, with such inside diameter progressively decreasing to as little as one half of the basic internal diameter at the end of the working section at restricted portion 35 or 351.

Although the manner in which fibers 52 operate to selectively absorb the oil-water mixture and separate it into its liquid components which are thereafter selectively discharged is not entirely clear, so that the explanation herein is not to be taken as binding as to the operation of the apparatus of the invention, it is believed that they so function as they pass through the extended driving and absorbing portion 24 or 241 of enclosure 20 and thereafter discharge a major portion of the water upon mild compression thereof adjacent water outlet 26 or 261 by reduced portion 28 or conical portion 70, a major portion of the oil upon high compression thereof adjacent oil outlet 32 or 321 by reduced portion 33 or conical portion 701, and the remaining portion of the oil upon still higher compression thereof adjacent oil outlet 34 or 341 by reduced portion 35 or 351.

Leading driving and sealing disk 54 and trailing driving and sealing disk 56, both of imperforate elastomeric material with an outer diameter slightly less than the inner diameter of enclosure 20, are mounted on axial support 50 forward and rearward of groups of fibers 52, respectively. For most efficient driving and sealing of assembly 40, the axial spacing between successive driving and sealing disks 54 and 56 and the axial spacing between and length of the reduced portions should be such that a driving and sealing disk 54 or 56 is present within one of the reduced portions, so that each of outlets 26 or 261, 32 or 321 and 34 or 341 and inlet 22 or 221 will be sealed from one another during operation.

It is also contemplated that a plurality of individual selectively absorbent compressible assemblies can be mounted on short individual central axial supports to entirely fill enclosure 20, with a front surface of a leading driving and sealing disk forming a bearing surface with a back surface of a preceding trailing driving and sealing disk.

In operation, the stream of oil-water mixture entering inlet 22 or 221 drives the selectively absorbent compressible assembly 40 in a downstream direction within tubular enclosure 20, shown by arrows in the drawings, both by the kinetic force created by the flow of the mixture pump 12 and by the differential piston hydraulic force created by the difference in diameter between absorbing portion 24 or 241 and third reduced portion 35 or 351.

As assembly 40 travels downstream through the extended driving and absorbing portion 24 or 241 of enclosure 20, selectively absorbent fibers 52 mounted on assembly 40 selectively absorb the oil-water mixture and separate it into its component liquids.

When assembly 40 encounters the first reduced portion 28 or conical portion 70 of enclosure 20, fibers 52 discharge a major portion of the water of the mixture through water outlet 28 or 281 upon mild compression by first reduced portion 28 or conical portion 70. This water is discharged into reservoir 37 for possible further purification.

A major portion of the oil of the mixture and a remaining portion of the oil are recovered in similar fashion. As assembly 40 is propelled beyond the first reduced portion 28 or along conical portion 70, fibers 52 discharge oil through oil outlet 32 or 321 upon high compression by second reduced portion 33 or conical portion 70.

The remaining portion of the oil is discharged through oil outlet 34 or 341 upon still higher compression by the third reduced portion 35 or 351. The recovered oil flows into reservoirs 38 and 39, respectively, and are available for further purification.

The third and final reduced portion 35 or 351 also provides two other functions which are important to the operation of the apparatus of the invention.

The first of these is its provision of a differential piston, since the internal diameter of the final reduced portion is substantially less than the internal diameter of the succeeding driving and absorbing portion 24 or 241, which makes possible the driving of selectively absorbent assembly 40 around enclosure 20 solely by hydraulic force.

In addition, kinetic hydraulic driving force is produced by the jet pump effect provided by the downstream slope of inlet 22 or 221, although this is of less importance than the hydraulic driving force provided by the aforementioned differential piston effect, to the extent that a perpendicular rather than a sloped inlet could be used.

The other important function provided by reduced portion 35 or 351 is that of backflow prevention by preventing assembly 40 from being driven backwards through enclosure 20. This function prevents the oil-water mixture entering inlet 22 or 221 from flowing in the reverse direction directly from inlet 22 or 221 to third outlet 34 or 341, without passing through the working section of the apparatus.

Further modifications of the novel apparatus of the invention, within the spirit thereof and the scope of the appended claims, will be apparent to those skilled in the art.

What is claimed is:

1. Immiscible liquid mixture separating apparatus, comprising
    a closed loop tubular enclosure having a liquid mixture inlet and first and second liquid outlets spaced from each other and from said inlet, the inner cross section area of said enclosure having a first reduced portion adjacent said first outlet and a second further reduced portion adjacent said second outlet, and
    selectively absorbent compressible means within said enclosure mounted for movement therearound, said means absorbing at least a portion of said liquid mixture adjacent said inlet and discharging a major portion of one liquid through said first outlet upon mild compression thereof by said first reduced portion and a major portion of another liquid through said second outlet upon high compression thereof by said second further reduced portion.

2. Immiscible liquid mixture separating apparatus, comprising
    a closed loop tubular enclosure having a liquid mixture inlet and first and second liquid outlets spaced from each other and from said inlet, the inner cross section area of said enclosure having a first reduced portion adjacent said first outlet and a second further reduced portion adjacent said second outlet
    mixture input means for feeding an immiscible liquid mixture into said inlet, and
    selectively absorbent compressible means within said enclosure movably mounted therein for continuous movement therearound by the force of said liquid mixture from said inlet in a downstream direction from said inlet first to first outlet and next to said second outlet,
    said absorbent means selectively absorbing said immiscible liquid mixture adjacent said inlet and discharging first a major portion of one liquid through said first outlet upon mild compression of said compressible means by said first reduced portion and next a major portion of another liquid through said second outlet upon higher compression of said compressible means by said second further reduced portion.

3. Immiscible liquid mixture separating apparatus as claimed in claim 2, wherein
    said first reduced portion is located between said first outlet and said second outlet and said second reduced portion is located between said second and said inlet.

4. Immiscible liquid mixture separating apparatus as claimed in claim 2 or 3, wherein
    said tubular enclosure has an absorbing portion of generally constant cross section area located between said inlet and said first outlet.

5. Immiscible liquid mixture separating apparatus as claimed in claim 2 or 3, wherein
    said tubular enclosure has a third outlet located between said second reduced portion and said inlet.

6. Immiscible liquid mixture separating apparatus, comprising
    a closed loop tubular enclosure having an immiscible liquid mixture inlet, a first outlet spaced from said inlet by a driving and absorbing portion of said enclosure and a second outlet located between said first outlet and said inlet, the inner cross section area of said enclosure having a first reduced portion located adjacent said first outlet and a second further reduced portion adjacent said second outlet
    mixture input means for feeding said immiscible liquid mixture into said inlet, and
    selectively absorbent compressible means within said enclosure in contact with the inner wall of said enclosure and movably mounted therein for continuous movement therearound by the force of said immiscible liquid mixture fed from said inlet in a downsteam direction from said inlet first to said first outlet and next to said second outlet
    said absorbent means selectively absorbing said immiscible liquid mixture in said driving and absorbing portion and discharging first a major portion of one liquid through said first outlet upon mild compression of said compressible means by said first reduced portion and next a major portion of another liquid through said second outlet upon higher compression of said compressible means by said second further reduced portion.

7. Immiscible liquid mixture separating apparatus as claimed in claim 6, wherein
    said tubular enclosure has a third outlet located between said second outlet and said inlet and a third reduced backflow prevention portion located between said third outlet and said inlet of still further reduced cross section area, and
    said absorbent means discharges a remaining portion of liquid through said third outlet upon still higher compression of said compressible means by said third reduced backflow prevention portion.

8. Immiscible liquid mixture separating apparatus as claimed in claim 1, 2 or 6 wherein said selectively absorbent compressible means comprises
support means within said enclosure, and
a plurality of selectively absorbent fibers mounted on said support means and extending outwardly therefrom toward the inner wall of said enclosure, said fibers selectively absorbing said immiscible liquid mixture and releasing a major portion of one liquid upon mild compression thereof adjacent said first outlet and a major portion of another liquid upon higher compression thereof adjacent said second outlet.

9. A selectively absorbent compressible element as claimed in claims 1, 2, 6 or 8, further including
driving disk means mounted on said support means spaced from one another.

10. Immiscible liquid mixture separating apparatus as claimed in claims 1, 2, or 6 wherein
said support means extends continuously around said enclosure.

11. Immiscible liquid mixture separating apparatus as claimed in claim 1, 2 or 6 further including
pressurizing means for pressurizing and feeding said immiscible liquid mixture to said inlet.

* * * * *

UNITED STATES PATENT AND TRADEMARK OFFICE
CERTIFICATE OF CORRECTION

PATENT NO. : 4,267,043
DATED : May 12, 1981
INVENTOR(S) : Robert A. Benson

It is certified that error appears in the above-identified patent and that said Letters Patent are hereby corrected as shown below:

Column 2, lines 37-38, "water outlet 26" should be --oil outlet 32--;

Column 3, line 5, "closed toop" should be --closed loop--;

Column 4, line 17, "portion 701, and" should be --portion 70, and--.

Signed and Sealed this

Thirteenth Day of July 1982

[SEAL]

Attest:

GERALD J. MOSSINGHOFF

*Attesting Officer*

*Commissioner of Patents and Trademarks*